United States Patent [19]

Leibow et al.

[11] 4,208,592

[45] Jun. 17, 1980

[54] COMPRESSED AIR POWER GENERATING SYSTEM

[76] Inventors: Baruch Leibow; Isaac Leibow, both of Hashilowach St., #16, Haifa, Israel

[21] Appl. No.: 940,378

[22] Filed: Sep. 7, 1978

[51] Int. Cl.² .................................... H02K 7/18
[52] U.S. Cl. ........................... 290/52; 60/407; 322/35; 417/411
[58] Field of Search ............... 290/52, 54, 43, 44; 322/35, 38, 40; 60/407, 412, 410, 419; 417/411

[56] References Cited

U.S. PATENT DOCUMENTS

| | | | |
|---|---|---|---|
| 2,794,129 | 5/1957 | Palmenberg et al. | 290/52 |
| 2,839,269 | 6/1958 | Gillen | 60/412 |

*Primary Examiner*—J. V. Truhe
*Assistant Examiner*—Morris Ginsburg

[57] ABSTRACT

A system for converting compressed air to motive power for generating electricity, a part of the output being used to partially recharge an initial compressed air source, thereby permitting the device to operate for extended periods without an external source of energy.

3 Claims, 1 Drawing Figure

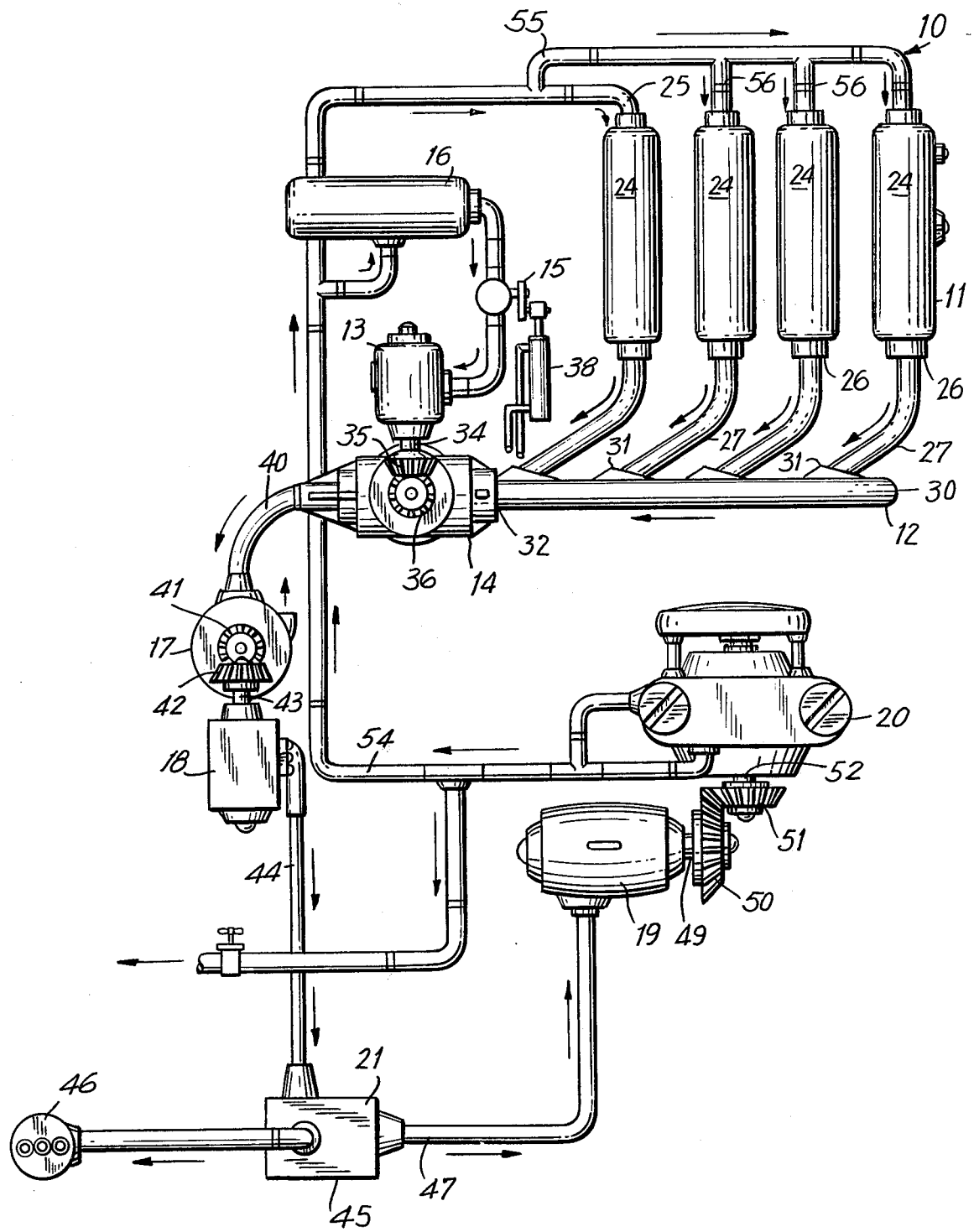

COMPRESSED AIR POWER GENERATING SYSTEM

BACKGROUND OF THE INVENTION

This invention relates generally to the field of electric power generation, and more particularly to an improved form of small generating plant adapted to operate for relatively extended periods of time in the order of several hours without other than an initial charge of compressed air as an energy source. Such devices are particularly useful in specialized applications where petroleum fuels and the like are not readily available or usable.

Motors and turbines operating from power generated by expanding gasses are well known in the art, such devices normally employing combustible fuels in either liquid or gaseous form. The use of compressed air motors for a variety of functions is also known.

Where a constant energy source is continuously supplying a compressed or expanding gas under pressure, continuous operation may be maintained without difficulty. However, when only a fixed individual charge of such gas is available, a constant diminution in pressure soon makes continuous operation of such devices impossible.

SUMMARY OF THE INVENTION

Briefly stated, the invention contemplates the provision of a compressed air system capable of generating electricity for extended periods of time using an initial charge of compressed air which is utilized in such manner that the devices using such compressed air ultimately compress small amounts of air under high pressure which is returned to the initial source, thus maintaining operational pressure for a longer period of time than would otherwise be the case. Devices of this type have application in specialized situations where the use of combustible fuels is not possible, but the requirement for continuous generated power is substantially greater from a time standpoint than is normally available from a fixed charge compressed air source.

BRIEF DESCRIPTION OF THE DRAWING

In the drawing, to which reference will be made in the specification, the FIGURE is a fragmentary schematic view of an embodiment of the invention.

DETAILED DESCRIPTION OF THE DISCLOSED EMBODIMENT

In accordance with the invention, the device, generally indicated by reference character 10, comprises broadly: a rechargeable source of compressed air 11, a compressed air manifold element 12, an air powered stand element 13, an air regulating sprayer element 14, an air valve means 15, an auxiliary cylinder element 16, an air turbine element 17, an electrogenerator 18, an electromotor 19, a compressor element 20 and a power output junction 21.

The chargeable source 11 includes a plurality of air cylinders 24 having charging inlets 25 and exhaust outlets 26 including conduits 27 feeding the manifold 12.

The manifold 12 includes a closed end 30, a plurality of inlet connections 31, and a single outlet 32 leading to the sprayer element 14.

The stand element 13 includes an air motor (not shown) having an output shaft 34 mounting a bevel gear 35 which drives a corresponding bevel gear 36 on the sprayer element 14. The motor is powered from the auxiliary cylinder element 16 and controlled by the valve means 15 by means of a small air cylinder 38 and associated linkage. Means (not shown) controls the cylinder 38 such that with diminution of pressure in the source 11, more air is fed from the auxiliary cylinder element 16 to enable the sprayer to distribute a greater flow of air to the turbine 17, thereby maintaining a constant angular velocity in the latter.

Extending from the sprayer element 14 is a conduit 40 leading directly to the turbine 17. The turbine drives through bevel gears 41 and 42 a shaft 43 on the generator 18, the output of the same flowing over leads 44 to a junction box 45 having a power outlet 46. Another set of leads 47 leads to the motor 19, the output shaft 49 of which drives through bevel gears 50 and 51 and input shaft 52 of the compressor 20. The compressor 20 is in the form of a positive displacement blower, and delivers a relatively small volume of air at a pressure substantially higher than the initial pressure in the source 11. The output of the compressor is fed over conduits 54 and 55 to a return conduit 56 servicing the charging inlets 25 of the source 11.

OPERATION

To commence operation, the cylinders comprising the source 11 are charged to approximately 12 atmospheres pressure. It is to be noted that the stand is separately driven by auxiliary cylinders and may operate on considerably lower pressure. The individual cylinders of the source 11 may be drained either serially, or in parallel, and in either event is regulated such that when pressure is relatively high, the air reaching the turbine is forced to move through more constricted passages. As pressure drops, the sprayer rotates more rapidly, enabling the air to more readily reach the turbine, thereby maintaining substantially constant velocity necessary to maintain a correspondingly constant output from the generator.

During operation, compressed air is continuously being supplied to the source 11 from the compressor, although it will be readily appreciated that because of the reduced volume available from the compressor, the pressure in the source will be continuously diminished, although at a much lower rate than would be the case if no replenishment of compressed air were available. During operation, a continuous flow of electrical energy may be drained from the junction box, and power output remains substantially constant, until the pressure in the source drops below that necessary to sustain operation of the turbine. Where roughly ⅓ of the available energy from the generator is extracted, the system can sustain itself for more than three hours of continuous operation. It can be recommenced by recharging the source 11 to its initial pressure.

To obtain the equivalent amount of operating time without partially restoring pressure in the source, the source itself would need to be many times larger than is otherwise necessary, and since pressure drop during operation would not be in a straight line, but a continuously diminishing curve, proper operation would be impossible while less than half of the available volume in the source is consumed.

I wish it to be understood that I do not consider the invention limited to the precise details of structure shown and set forth in this specification, for obvious modifications will occur to those skilled in the art to which the invention pertains.

I claim:

1. An improved compressed air generating system comprising: a chargeable source of compressed air, air motor means driven from said chargeable source, means for regulating the flow of air from said source to said motor means for automatically maintaining substantially constant speed of said motor means during changes in pressure in said source, generator means driven by said air motor means, means for utilizing part of the electrical energy generated by said generator means for external power, an electromotor driven by a remaining part of said electrical energy, air compressor means driven by said electromotor, and means conducting the output of said air compressor means to said chargeable source.

2. A system in accordance with claim 1, further characterized in said air motor means being in the form of a turbine, and said regulating means being in the form of a rotary air sprayer in series with the flow of compressed air to said turbine, and sensitive to varying pressure in said chargeable source.

3. A system in accordance with claim 1, further characterized in said air compressor producing compressed air at a pressure above that in said chargeable source.

* * * * *